United States Patent [19]
Miki et al.

[11] Patent Number: 5,197,507
[45] Date of Patent: Mar. 30, 1993

[54] LINEAR SOLENOID VALVE APPARATUS AND METHOD ASSEMBLING

[75] Inventors: Nobuaki Miki, Kariya; Masao Saito, Nishio; Takeya Oka, Nagoya; Kunhiro Iwatsuki; Hideaki Otsubo, both of Toyota; Yasuo Hojo, Nagoya; Yutaka Taga, Aichi, all of Japan

[73] Assignees: Aisin AW Co., Ltd.; Toyota Jidosha Kabushiki Kaisha, both of Japan

[21] Appl. No.: 786,810

[22] Filed: Nov. 5, 1991

[30] Foreign Application Priority Data

Nov. 5, 1990 [JP] Japan ................. 2-300354

[51] Int. Cl.⁵ .......................... F15B 13/044
[52] U.S. Cl. ..................... 137/1; 137/625.65;
                                           251/129.16; 251/129.18
[58] Field of Search ............... 137/625.65, 1;
                                           251/129.16, 129.18

[56] References Cited

U.S. PATENT DOCUMENTS 4,838,518  6/1989  Kobayashi et al. ........ 137/628.65 X
4,971,116 11/1990  Suzuki et al. .................. 137/625.65
5,004,440  4/1991  Suzuki .

*Primary Examiner*—Gerald A. Michalsky
*Attorney, Agent, or Firm*—Lorusso & Loud

[57] ABSTRACT

A linear solenoid valve apparatus includes an electromagnetic valve, a modulator valve with a valve sleeve, valve spool, a spring biasing the spool, a feedback pressure chamber, and an adjusting means provided between the electromagnetic valve and the modulator valve so that the plunger position corresponding to the value of suction power coincides with the spool position.

6 Claims, 4 Drawing Sheets

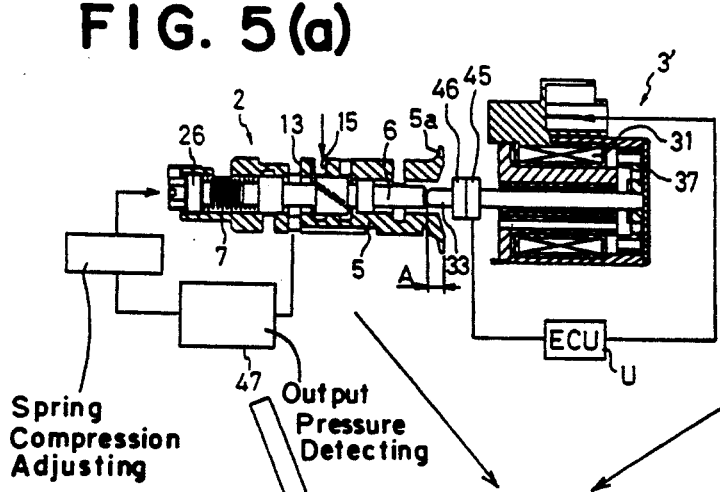
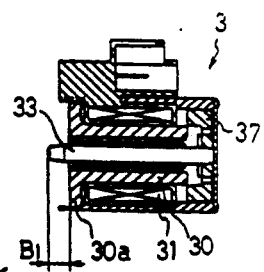
FIG. 5(a) FIG. 5(b)
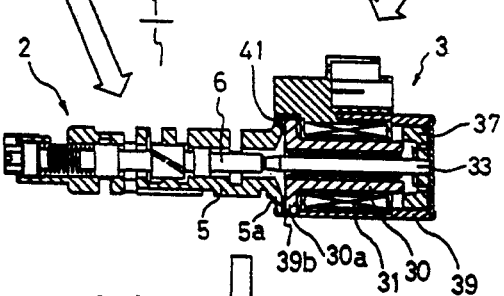
FIG. 5(c)
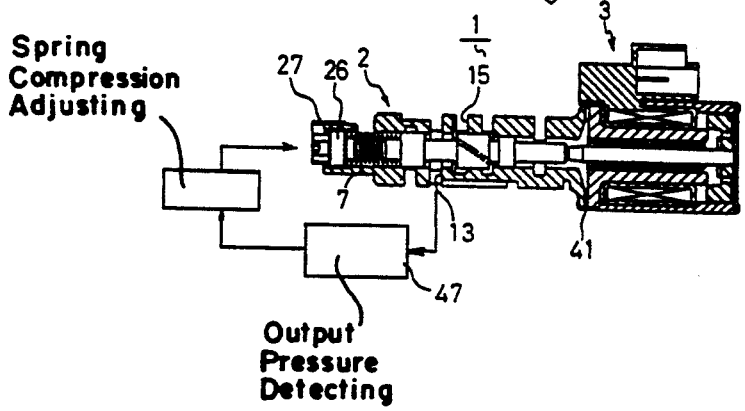
FIG. 5(d)

LINEAR SOLENOID VALVE APPARATUS AND METHOD ASSEMBLING

BACKGROUND OF THE INVENTION

1. Field of the Invention

The present invention relates to a linear solenoid valve apparatus and a method for assembling in which a hydraulic fluid flow is varied in accordance with an electric signal, for example, the valve of electric current and in particular relates to a linear solenoid valve used for controlling a primary regulator valve to regulate a line pressure.

2. The Prior Art

In general, a linear solenoid valve includes a modulator valve and an electromagnetic valve. The electromagnetic valve includes a plunger operated in accordance with an electric current. The modulator valve includes a spool, a spring biasing the spool, a feedback oil pressure chamber for moving the spool to a position supplying a modulated fluid pressure from a supply port to an output port. It is necessary to form a structure which supplies a modulated fluid pressure corresponding to an electric current in a fixed error range.

In answer to the above problem, as shown in FIG. 6, the value of the energizing force in an electromagnetic valve was predetermined (so-called flat characteristic) to be a constant, regardless of the manufacturing error for the plunger stroke in the pressure modulating range. It was necessary to set the tolerance between the core and the plunger accurately and very important to provide the proper magnetic pull in the electromagnetic valve for the so-called flat characteristic. The above-described tolerance, however, is limited to a fixed value when the product is manufactured and a manufacturing error in the size of the electromagnetic portion has a great influence on the so-called flat characteristic. In particular, high accuracy is necessary in the design of a linear solenoid valve apparatus disposed in a valve body and formed in a more compact size, as used in an automatic transmission installed in a restricted vehicle space. It is very difficult to provide so-called flat characteristic in a linear solenoid valve apparatus which has an electromagnetic valve formed of a short length (for example, in the case that the radial size of 31 o is shortened to 28 o) while keeping a high electric current (for example, 1A) to provide sufficient force, or even if a low electric current were used.

A linear solenoid valve having a plunged adjusted at a return position by a screw in an electromagnetic valve or adjusted at an axially fixed location by disposing an E-ring between the spool and the push rod is disclosed in Tokkaihei 2-180390 patent specification. Even with this structure, a small size solenoid valve apparatus cannot be designed in the tolerance range by modifying the above-described spool as shown by dotted line "a" in FIG. 6, while manufacturing high electric current, for example 1A.

SUMMARY OF THE INVENTION

Accordingly, it is an object of the present invention to provide a linear solenoid valve apparatus and a method for assembling in which it is possible to form it in compact size and simply construction and to eliminate manufacturing errors of the products so as to improve reliability by designing the apparatus so that the magnetic power characteristics of a plunger stroke with high electric current, in particular becomes a sloped characteristic and each electromagnetic valve and modulator valve is arranged to make the sloped characteristic correspond to the plunger location.

To accomplish the above objective, the linear solenoid valve apparatus of the present invention includes an electromagnetic valve having an electromagnet with a core and a coil assembly, a modulator valve having a valve sleeve with a supply port, an output port and a exhaust port and a spool slidably mounted in the sleeve. A spring biasing the spool and a feedback pressure chamber serve to position the spool at a position in order to supply a modulated fluid pressure from a supply port to an output port by balancing spring force, output feedback pressure and the magnetic force received by the plunger.

The electromagnet is designed to generate a magnetic force on the plunger corresponding to the slope characteristic varied in accordance with the plunger stroke position and has an adjusting means for adjusting the plunger stroke position corresponding to the fixed value of magnetic power in the slope characteristic and the spool position for supplying an output fluid pressure corresponding to a value which coincides with the plunger stroke position.

A method for assembling the linear solenoid valve apparatus of the present invention involves adjusting spring force to supply a predetermined output fluid pressure from the modulator valve under the condition of a fixed loading on the spool, detecting the spool position under that condition, detecting the plunger position corresponding to the fixed loading on the plunger in the slope characteristic, and adjusting the plunger magnetic attraction power according to correspond to the slope characteristic varied in accordance with the plunger position in the electromagnetic valve, and providing a fixed adjusting means between the electromagnetic valve and the modulator valve.

The linear solenoid valve apparatus assembled by the above method, has the plunger stroke position corresponding to the fixed magnetic attraction power within a fixed range, since the plunger magnetic attraction power varies according to the plunger position under a fixed electric signal, that is, high electric current, for example 1A. Also, the linear solenoid valve apparatus is adjusted to supply a fixed output fluid pressure corresponding to the electromagnetic valve stroke position by the adjusting means.

Accordingly, the linear solenoid valve apparatus is adjusted to supply a fixed output fluid pressure corresponding to the fixed electric signal by eliminating the manufacturing errors.

BRIEF DESCRIPTION OF THE DRAWINGS

These and other objects and advantages of the present invention will become clear from the following description with reference to the accompanying drawings, wherein:

FIGS. 5 (a), (b), (c) and (d) illustrate the steps in assembly of the linear solenoid valve apparatus.

DESCRIPTION OF THE PREFERRED EMBODIMENTS

Figure 1:
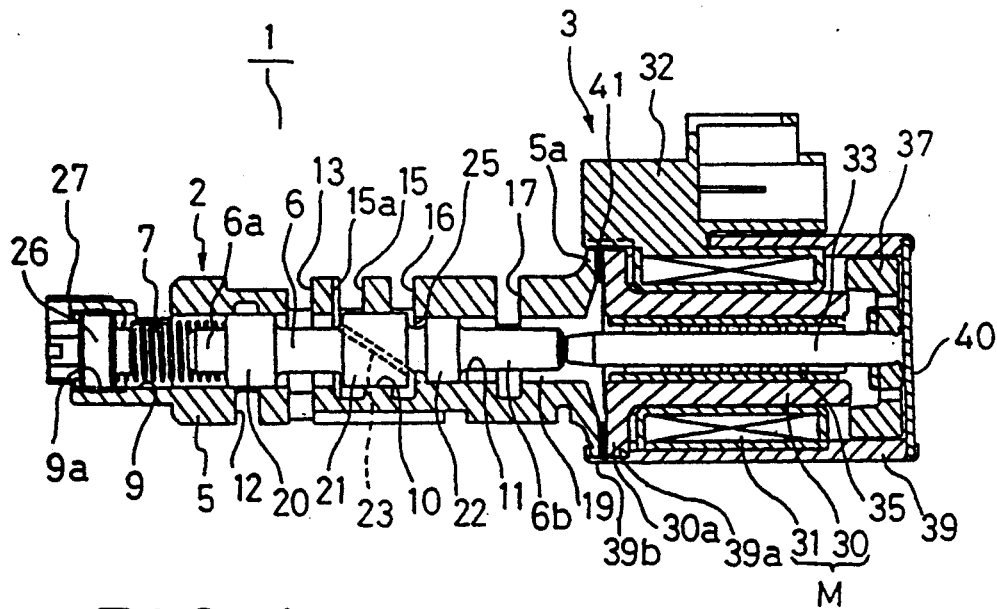
FIG. 1 is a cross-sectional view of a linear solenoid valve apparatus.
Figure 2:
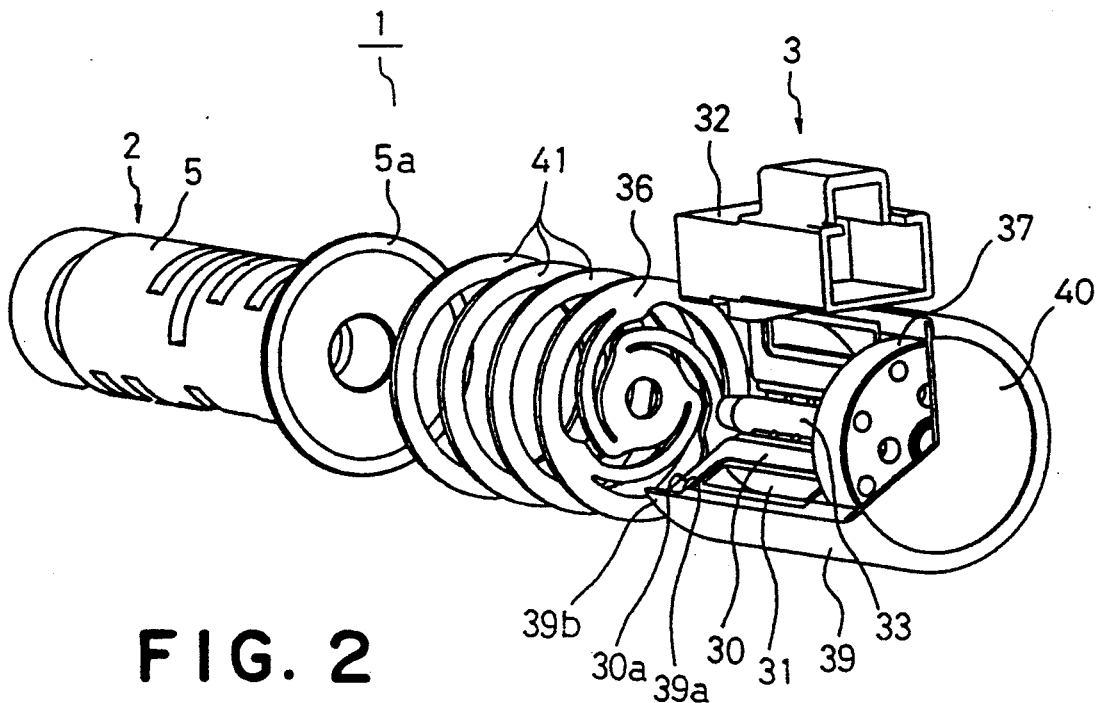
FIG. 2 is a partial schematic view of the apparatus of FIG. 1.

Turning now more specifically to the drawings, a linear solenoid valve 1, as shown in FIG. 1 and 2, has a modulator valve 2 and an electromagnetic valve 3. Furthermore, the modulator valve 2 has a valve sleeve 5 and a spool 6. Valve sleeve 5 has a hole 9 therein for housing a spring 7, a large size guide hole 10 and a small size guide hole 11 for slidably receiving the spool 6. In the valve sleeve 5, in communication with the guide hole 10, are an exhaust port 12 opened in radial direction, an output port 13, and a supply port 15. Circumferential conduits are formed in communication with each of these ports. The supply port 15 has a notch 15a for damping oil pressure vibrations and for regulating supply pressure to a fixed output pressure by restricting fluid pressure through the spool as described below. A feedback chamber 16 is formed by spool lands described below and is closed so as not to be connected to any passage. An open passage 17 serves to bleed oil pressure from chamber 19.

Spool 6 has two lands 20 and 21 disposed slidably in the large size guide hole 10 and a land 22 disposed slidably in the small size guide hole 11. One of the large size lands 21 has an oil hole 23 for feedback pressure therethrough and the other large size land 20 connects an output port 13 to an exhaust port 12 while restricting oil communication therebetween to prevent the output fluid pressure from exceeding a fixed value. One of the large size lands 21 restricts communication between supply port 15 and output port 13 to provide a modulated oil pressure, corresponding to the position of spool 6, from the supply port 15 to output port 13 as an output pressure. The relationship between each port and land defining the valve as having the so-called overlapped type structure. Ordinarily, support port 15 is in communication with output port 13 by a restricting oil pressure. A feedback chamber 25 is disposed between one of large size lands 21 and a small size land 22, and is supplied an output fluid pressure through a feedback oil pressure hole 23 to provide a feedback pressure against the force of a spring 7.

Spool 6 has a projection 6a at one end thereof for holding a spring 7 and a leg 6b at the other end thereof. The valve sleeve 5 has threads 9a at the end of the hole 9, in which an adjusting bolt 26 is threaded. A coil spring 7 is provided between the adjusting bolt 26 and the projection 6a and the spring force is adjusted by rotation of the bolt 26. Furthermore, the valve sleeve has an engaging means 27 for fixing the position of the bolt 26.

The valve sleeve 5 has a radially extending flange 5a at the front end thereof, by which the modulator valve 2 is fixed to electromagnetic valve 3.

Electromagnetic valve 3 has a cylindrical core 30 and an electromagnetic coil assembly 31 disposed around the core 30 to form an electromagnet M which receives a fixed electric current through a connector 32. The core 30 has a flange 30a at the end facing modulator valve 2. A push rod 33 is supported slidably in the center hole of the core 30 through a linear type rolling bearing. One end of the push rod 33 contacts spool 6 of the modulator valve and is supported by a spring 36 (FIG. 2) disposed between flanges 5a and 30a of valve sleeve 5 and core 30, respectively. The other end of the push rod 33 has a plunger 37 fixed thereto, which can be moved in the axial direction by the electromagnet M. Accordingly, the push rod 33 and the plunger 37 move together.

Furthermore, a cylindrical case 39 is fixed to electromagnetic coil assembly 31 at the outer circumference thereof. A cap 40 is fixed to the case 39 at the front end thereof and electromagnetic valve 3 is covered tightly by the case 39 and cap 40. Case 39 has a step 39a and a recessed portion 39b at the end adjacent modulator valve 2. Modulator valve 2 is connected and fixed to electromagnetic valve 3 by pinching together flanges 30a and 5a through spacers 41 described below between a core flange 30a and a valve sleeve flange 5a fitting core flange 30a valve sleeve flange 5a within recess 39b.

Figure 3A:
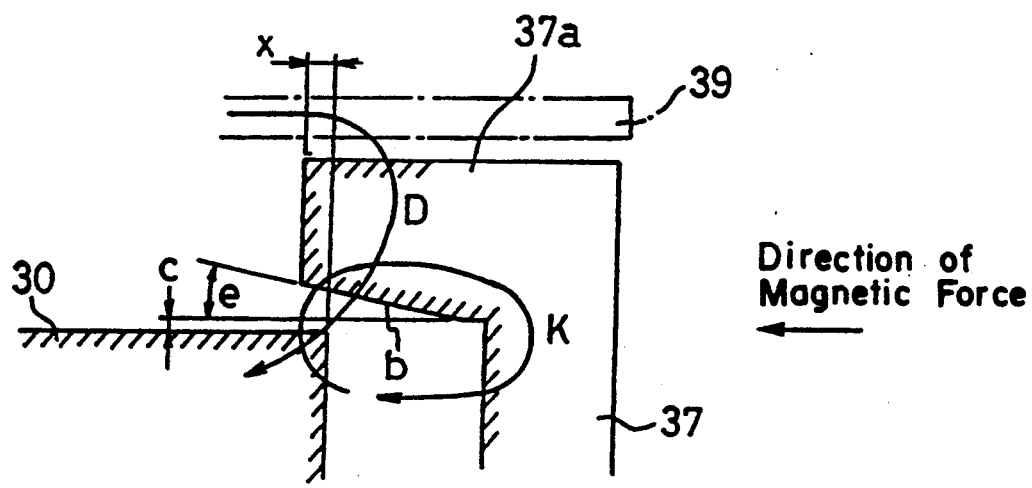
FIG. 3(a) is a partial cross-sectional view of plunger and an electromagnetic coil.

Plunger 37 is, as shown in FIG. 3(a), a cup-shaped member having an axially extended lip 37a. A fixed clearance "c" is provided between the inner surface of the lip 37a and the end of the core 30. The inner surface of the lip portion 37a is formed with a taper "b" at a fixed angle "e" to the flat surface. Furthermore, when an electromagnet M is deenergized, the end surface of the core 30 is overlapped by the lip portion 37a with an axial overlap "x".

Figure 3B:
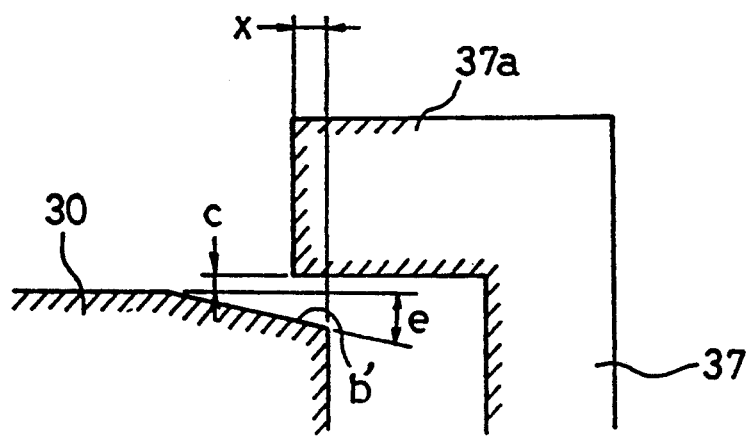
FIG. 3(b) is a partial cross-sectional view of another embodiment of a plunger and electromagnetic coil.

FIG. 3(b) shows a partially changed embodiment. In the embodiment of FIG. 3(b) 37a has an inner surface in parallel with the axis and a surface "b'" tapered at a fixed angle "e" is provided on the end of core 30.

Figure 4:
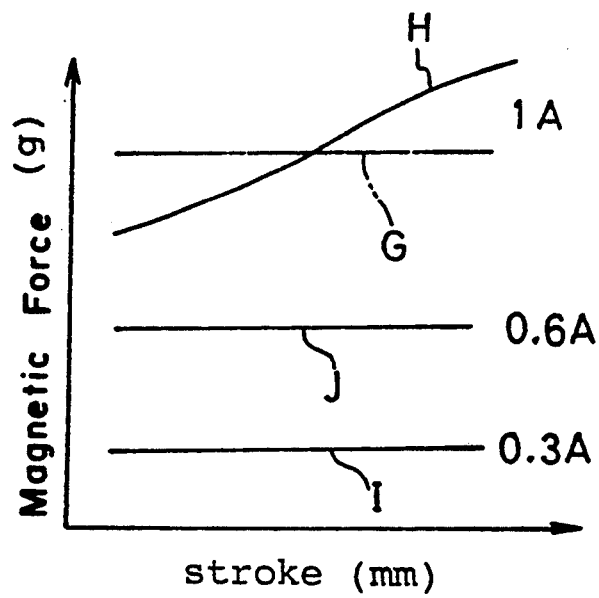
FIG. 4 is a graph of the relationship between the magnetic force on the plunger and the stroke.
Figure 6:
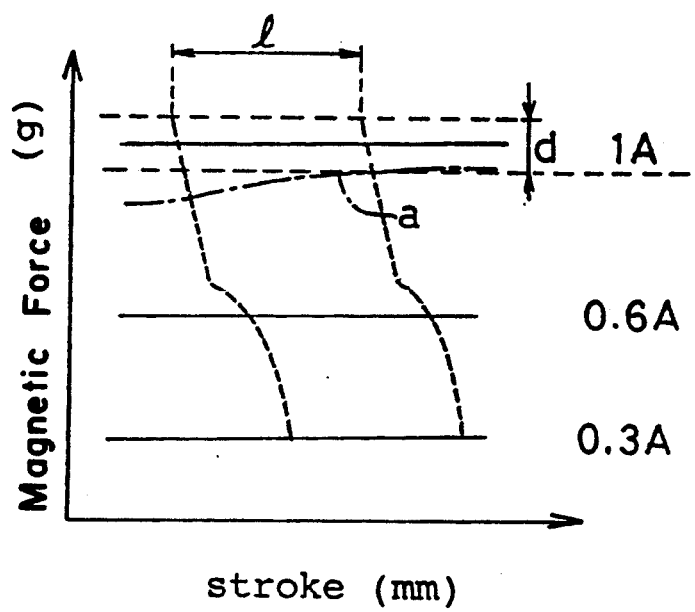
FIG. 6 is a graph depicting the characteristics of a conventional electromagnetic valve.

In the above-described structure 30, the magnetic force exerted on the plunger 37 by electromagnet M is determined by a magnetic circuit D through core 30, clearance "c", lip 37a and a case 39, and by the magnetic circuit K between core 30 and plunger 37. Magnetic circuit D imparts a radial force on plunger 37 and magnetic circuit K provides an axial force. Accordingly, these forces determine the output of electromagnetic valve 3. The power characteristic (flat characteristic or slope characteristic) is determined by clearance "c", tapered angle "e" and overlap distance "x". For example, when the clearance "c" and the taper angle are smaller than usual, a flat characteristic, as shown dotted line G in FIG. 4, under high electric current 1A, is changed to a line H with a fixed slope (slope characteristic). Even with such a clearance "c" and taper angle "e" characteristics I and J, are near the usual flat characteristics due to the fact that the axial force generated by the magnetic circuit K does not increase due to keeping low electric current, for example, 0.3 A and 0.6 A. To set the slop characteristic of electromagnetic valve 3, a fixed quantity of spacers 41 are provided between the spool flange 5a and the core flange 30a so that the stroke of the plunger 37 corresponding to the fixed value of the magnetic power coincides with the spool position effecting an output fluid pressure in response to the fixed value in the modulator valve 2.

FIG. 5(a) shows the method for assembling a linear solenoid valve described above. The modulator valve 2 is connected to an electromagnetic valve 3' with a large diameter (for example, 31 o mm). A load detecting sensor 45 and a position sensor 46 are disposed at the end of push rod 33 in the electromagnetic valve 3'. A load detecting sensor 45 is connected to the controller U for controlling electric current sent to electromagnetic coil assembly 31 in the electromagnetic valve 3'. The controller U controls the electromagnetic valve 3' so that the value detected by the loading detecting sensor 45 is kept at a fixed loading (for example 800 g) according to the controlled electric current.

Modulator valve 2 has a supply port 15 supplied a fixed oil pressure and an output port 13 in fluid communication with an output pressure detecting sensor 47. Adjusting bolt 26 is adjusted in rotating loading at the output pressure detecting sensor 47 so that the output pressure supplied from the output port 13 becomes the value of 0.3 kg/cm$^2$, corresponding to the lowest line pressure, based on the fixed loading yielded by the electromagnetic valve 3'. Accordingly, the modulator valve 2 supplies a fixed pressure corresponding to a fixed loading. The position of the spool 6, that is, the distance "A" between a flange 5a and the end of the spool is detected by the position detecting sensor 46. The modulator valve 2 may be measured or adjusted automatically although in the above embodiment the adjustment is done manually.

In an electromagnetic valve 3' as shown in FIG. 5(b), the relationship between the magnetic force "F" on the plunger and the plunger stroke "S", under high electric current 1A supplied to the electromagnetic valve 3, is detected by the load detecting sensor and the position detecting sensor (not shown in Fig.), in the same manner as the monitoring of the modulator valve in the previously described embodiment. The force "F" as shown in FIG. 5(b) has a sloped characteristic which increases as the plunger 37 moves from the position $B_2$ near one end of the core to the position $B_0$ near the other end of the core. The plunger position, that is, the distance "$B_1$" between the end of the core flange 30a and the end of the push rod 33 is detected at the fixed magnetic force "Fm" (for example 800 g) while supplying a high electric current of 1A in the slope characteristic.

The number of spacers 41 is determined so that the location of the spool 6 at the fixed output pressure coincides with the location of the push rod 33 (i.e. plunger 37) for a given set of modulator valve 2 and electromagnetic valve 3. In more detail, $B_1 - A/t = n$ where "$B_1$" is the position of the push rod 33 (plunger), "A" is the position of the spool 6, "t" is the thickness of the spacer and, "n" is the number of the spacers. The spacers 41 may be a plurality of spacers of the same thickness or spacers of different thicknesses (for example, 0.25 mm, 0.1 mm, 0.2 mm and so on). A fixed number of spacers 41, as shown in FIG. 5(c), is disposed between the valve sleeve flange 5a and the core flange 30a, and the modulator valve 2 and the electromagnetic valve 3 are connected and fixed by engagement within recess 39b of the case 39 to assemble the linear solenoid valve apparatus.

Finally, as shown in FIG. 5(d) the assembly of a linear solenoid valve apparatus is completed by way of the following steps. While supplying a fixed supply pressure to the supply port 15, a fixed electric current is supplied to the electromagnetic valve 3 and it is determined if the output pressure from the output port increases to the fixed value, as monitored by the output pressure detecting sensor 47. The biasing force of the spring 7 is adjusted by bolt 26 so as to set the pressure at the fixed value when error is detected, and the bolt 26 is then fixed by the engaged means 27.

Operation of the linear solenoid valve apparatus utilized as a line pressure regulator in a hydraulic control device of an automatic transmission is as follows.

With an oil pump supply pressure to supply port 15, a fixed electric current is supplied to the electromagnetic coil assembly 31. Then, load "F", which is applied to the left side of spool 6 through push rod 33, corresponds to the magnetic force on plunger 37 generated by the engaged electromagnet "M". Under this condition, a force "Fsp" from spring 7 is applied to bias spool 6 to the right side, and oil pressure in feedback chamber 25, that is, an output pressure "P" (P (A1-A2)), biases spool 6 to the left side. The magnetic force "F" on plunger 37 is balanced with the other forces on spool 6 as follows:

$$F = Fsp - (A1 - A2)P$$

Accordingly, $$P = (Fsp - F)/(A1 - A2)$$

That is, supply pressure from supply port 15 is regulated so as not to be low when magnetic force "F" on plunger 37 is large and is supplied from output port 13 to a modulating port (not shown in Fig.) of a primary regulator valve. Where the electric current input is proportional to output pressure, the output pressure "P" becomes smaller as the electric current input to the electromagnet 3 is increased. Therefore, linear solenoid valve 1 supplies a higher output pressure as the electric current input becomes lower (high→low). Even if a line pressure is at its lowest, modulator valve 2 adjusts fluid pressure output to correspond to the fixed magnet force "F" received at a high electric current of 1A input to electromagnetic valve 3.

Accordingly, the modulator valve supplies an accurate, fixed output pressure. The magnetic force "F" has a flat characteristic when comparatively low electric current is supplied to electromagnetic valve 3. Further, the magnetic force "F" does not vary regardless of the axial position of plunger 37.

Line pressure is precisely regulated to correspond to the electric current input by precisely positioning spool 6 in accordance with a spring biasing force "Fsp" and a feedback pressure.

Though in the above embodiment the positions of the pool and plunger are adjusted by spacers 41, as one example, the positions may also be adjusted by adjusting the length of axial extension 6a of spool 6 or that of valve sleeve 5. According to the invention, each linear solenoid valve assembled is adjusted so that the plunger stroke position corresponding to a given electric signal in the electromagnet coincides with a spool position providing a fixed output pressure from the valve. Accordingly, the linear solenoid valve apparatus is manufactured with accuracy and reliability.

We claim:

1. A linear solenoid valve apparatus comprising:
   an electromagnetic operator including:
   a hollow, cylindrical core;
   a push rod slidably mounted within the hollow of said core;
   a coil assembly surrounding said core for applying a magnetic force for driving said push rod in a first direction, said magnetic force being proportional to electric current supplied to said coil; and
   a modulator valve coupled to said electromagnetic operator and including:
   a valve sleeve having a supply port, an output port and an exhaust port;
   a valve spool slidably mounted in said sleeve, said valve spool abutting said push rod in axial alignment therewith for movement by said push rod in the first direction;

a spring mounted in said sleeve for biasing said valve spool in a second direction, opposite said first direction;

a feedback pressure chamber for modulating fluid pressure received through the supply port to provide a modulated pressure at the output port by providing a feedback pressure to balance said magnetic force with the biasing force of said spring; and at least one spacer provided between said electromagnetic operator and said modulator valve, said spacer separating said core from said valve sleeve by a distance providing a sloped linear relationship between the position of said push rod and said magnetic force, said spacer having an annular configuration with a central opening, said push rod extending through said central opening spaced from said spacer to define an open annular space therebetween, with no connection between said push rod and said spacer.

2. The linear solenoid valve apparatus of claim 1 wherein said core and said valve sleeve each have a flange at one end and wherein said spacers are interposed between said flanges.

3. The linear solenoid valve apparatus of claim 2 wherein one end of said push rod extends beyond the face of the flange of said core a distance equal to the distance the end of said valve spool abutting said one end of said push rod is recessed from the face of the flange of said valve sleeve, at a predetermined pressure at said output port.

4. The linear solenoid valve apparatus of claim 1 additionally comprising:

a cup-shaped plunger mounted on the end of said push rod opposite the end of said push rod abutting said valve spool, said plunger being formed of a magnetic material, wherein said plunger has a hollow interior defined by an interior cylindrical surface and into which an adjacent end of said core is inserted as said push rod moves in said first direction, with a clearance between said adjacent end and said cylindrical surface, and wherein one of said cylindrical surface and said adjacent end has a taper whereby said clearance diminishes as said adjacent end enters the hollow interior of said plunger.

5. A method for assembling a linear solenoid valve apparatus having an electromagnetic actuator, including a push rod, an electromagnetic, a core and a coil assembly, and a modulator valve including a valve sleeve with a supply port, an output port and an exhaust port, a valve spool slidably mounted in the sleeve, a spring biasing the spool in one direction, a feedback pressure chamber for modulating fluid pressure received from the supply port and for supplying the modulated pressure to the output port to balance the electromagnetic force on the push rod against the spring force, said method comprising:

adjusting the compression in the spring to provide a predetermined fluid pressure at the output port while maintaining a constant loading on said push rod;

detecting the push rod position after said adjusting and with said predetermined pressure and constant loading;

determining a push rod position corresponding to said predetermined loading by reference to a predetermined sloped line relationship between push rod position and electromagnetic force; and adjusting the spacing between the electromagnetic actuator and the modulator valve to make said detected push rod position coincide with said determined push rod position under constant loading.

6. A method in accordance with claim 5 further comprising:

placing a load detecting sensor and a position sensor on the push rod, said position sensor providing said detecting of said push rod position;

connecting the coil assembly and the load detecting sensor to a source of current including a current controller;

controlling said current to maintain said constant loading on the push rod;

connecting a pressure sensor to the output port to detect fluid pressure at the outlet port; and wherein a bolt in contact with the spring is threaded into the valve sleeve and said adjusting of the compression is by turning the bolt.

* * * * *